United States Patent [19]

LaRue et al.

[11] Patent Number: 4,564,351

[45] Date of Patent: Jan. 14, 1986

[54] DEVICE FOR SHAPING THE TIP OF A SOFT WAX MARKER

[76] Inventors: Gayle M. LaRue, 29846 45th Pl. South, Federal Way, Wash. 98002; William A. Munday, 6503 57th Ave. Northeast, Seattle, Wash. 98115

[21] Appl. No.: 621,164

[22] Filed: Jun. 15, 1984

[51] Int. Cl.[4] .......... B29C 33/02

[52] U.S. Cl. .......... 425/383; 425/DIG. 13

[58] Field of Search .......... 425/392, 803, DIG. 13, 425/DIG. 32, 383; 249/78; 144/28.1, 28.11, 28.2, 28.3, 28.4, 28.5, 28.6, 28.7, 28.71, 28.72, 28.8, 28.9; 30/124

[56] References Cited

U.S. PATENT DOCUMENTS

| | | | |
|---|---|---|---|
| 2,580,092 | 12/1951 | Herbert et al. | 425/392 X |
| 2,875,556 | 3/1959 | Vigna et al. | 425/392 |
| 2,984,887 | 5/1961 | Thiess | 249/78 |
| 3,091,812 | 6/1963 | Witkowski . | |
| 3,166,792 | 1/1965 | Goldfarb . | |
| 3,233,292 | 2/1966 | Kramer, Jr. et al. | 425/392 X |
| 4,188,009 | 2/1980 | Gillespie | 249/78 |

*Primary Examiner*—Douglas D. Watts

*Attorney, Agent, or Firm*—Seed and Berry

[57] ABSTRACT

A tip-shaping device for crayons is disclosed. The device includes a cylindrical lower section housing a disposable paper cup for receiving melted wax and a conically-shaped top section holding a heat-conductive member with a tapered internal cavity and a drain opening at the bottom of the cavity for draining melted wax into the paper cup. The heat-conductive member is heated by a ceramic heater connected to a source of electrical power.

8 Claims, 4 Drawing Figures

DEVICE FOR SHAPING THE TIP OF A SOFT WAX MARKER

DESCRIPTION

1. Technical Field

This invention relates to a device and method for shaping the tip of a soft wax marker.

2. Background Art

Wax crayons are widely used by children and others at home, in school, and in day-care centers. Wax markers, similar to crayons, are also widely used commercially and industrially. Newly purchased crayons and markers have a shaped tip which enables accurate coloring and/or marking; however, the crayons and/or markers quickly wear down to blunt stubs which cannot be effectively or easily used, particularly by children. Devices for shaping and sharpening the marking end of crayons and wax markers are known. Many of these shape the tip by cutting action. See, for example, U.S. Pat. Nos. 66,513; 225,732; 372,315; 412,401; 679,136; 901,622; 1,018,768; 1,603,540; 2,013,538; 2,094,494; 2,151,869; 2,502,177; 2,691,960; 2,857,881; 3,097,629; 3,768,915; 3,869,794; and 4,158,912. Schweiger, U.S. Pat. No. 2,733,478, discloses a hot-water mold for use in reshaping heat-softenable crayon points. Herbert et al., U.S. Pat. No. 2,580,092, discloses an electrically heated pointer for fusible crayons or candles.

DISCLOSURE OF INVENTION

The primary object of this invention is to provide a tip-shaping device for wax crayons or marker pens which is effective, easy to use, and economical to manufacture. The shaping device comprises a vertically oriented housing having a top section containing a heat-conductive member mounted therein, the top section containing a central opening therein communicating with a conically shaped cavity in the heat-conductive member. At the bottom of the cavity is a relatively small opening for draining melted wax. A lower section to which the top section is connected comprises a base, sidewalls, and spaced brackets extending inwardly around the periphery thereof for supporting the rim of a disposable receptacle for melted wax such as a paper cup. A ceramic heater surrounds the heat-conductive member. Electrical means connect the ceramic heater to a source of power. Holding means extend down the length of the sidewall of the lower section for holding the electrical cord in place.

BEST MODE FOR CARRYING OUT THE INVENTION

Figure 1:
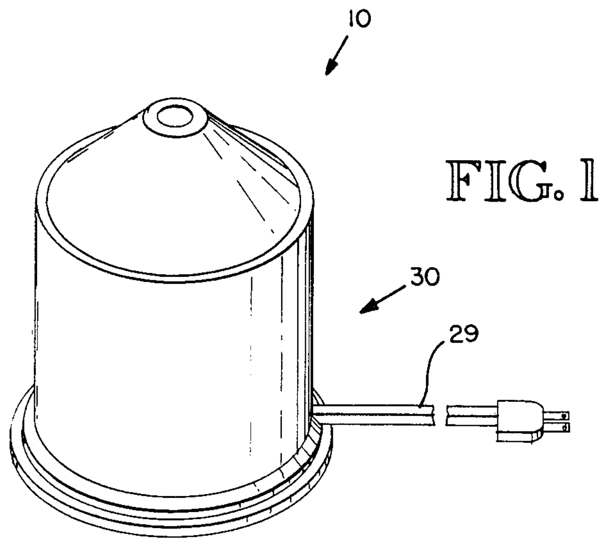
FIG. 1 is a perspective view of the shaping device of this invention.
Figure 3:
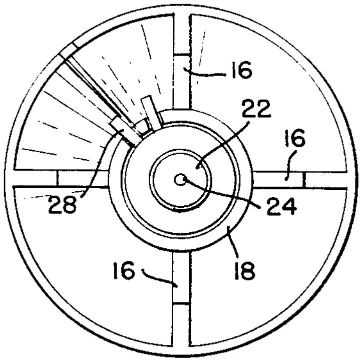
FIG. 3 is a horizontal cross-sectional view of the top portion of the shaping device of FIG. 1.
Figure 2:
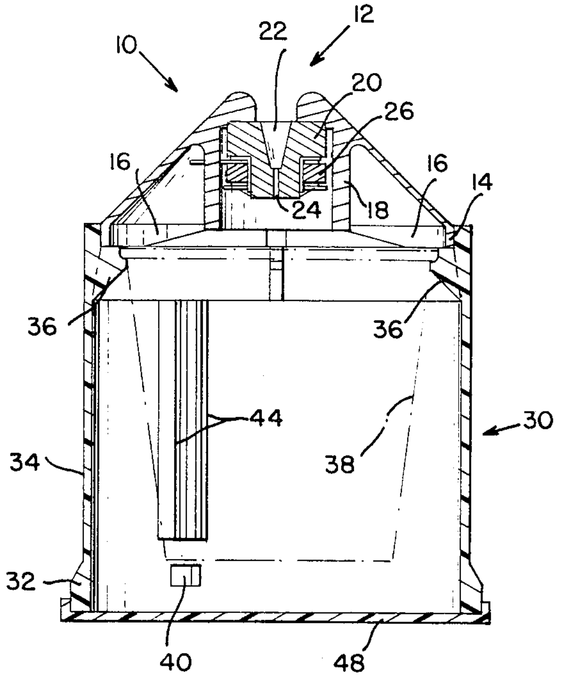
FIG. 2 is a vertical cross-sectional view of the shaping device of FIG. 1.

The shaping device of this invention comprises a conically shaped top section 10 and a bottom section 30. Referring to FIG. 2, the top section includes a central opening 12 which communicates with a hollow central cavity adapted to receive a heat-conductive member 20. The preferred configuration of the device is as shown in FIG. 1, a cylindrical member having a conically shaped top. The lower edge 14 of the top section is received in and forms the top cover of the lower section 30. The edge 14 butts against inwardly-extending brackets 36 brackets in the lower section. The heat-conductive member 20 is supported in the top section by a series of horizontal struts 16 extending inwardly from the lower edge of the inner wall of the top section and a series of vertical struts 18. The heat-conductive member 20 may be made of any suitable heatconductive material, but is preferably made of aluminum, which is highly heat conductive. The heat-conductive member 20 has a conically shaped cavity 22 therein, with the larger end of the cavity opening to the central opening 12 of the top section. At the lower end of the cavity 22 is a small drain hole 24 for draining excess melted wax. Surrounding the heat-conductive member is a ceramic heater 26 adapted to heat the heat-conductive member to a temperature sufficient to soften the tip of a crayon or wax marker for reshaping, generally from 185°–205° F. The ceramic heater is of conventional construction. Individual leads from the ceramic heater extend through openings 28 in the vertical strut 18 and are connected to conventional doublelead wiring 29 which extends down the sidewall of the lower section of the housing, and out through an opening 40 in the sidewall of the lower section for connection to a source of electricity, generally 110 volts, 60 cycle per second.

Figure 4:
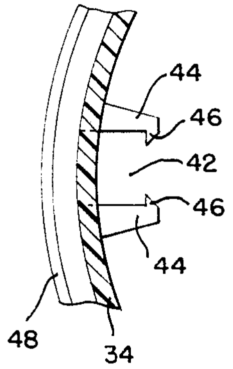
FIG. 4 is a partial cross-sectional view of the means for holding the electrically conductive member.

The lower section of the shaping device includes a lower edge 32, cylindrical sidewalls 34, and an open top. Near the top of the lower section are a number of inwardly extending support brackets 36 at spaced intervals. Each of these brackets is adapted to hold the rim of a removable and disposable paper cup 38 therein, such as a standard 5-ounce "Dixie" disposable cup. The brackets also support the top section. An opening 40 through the sidewall near the bottom of the lower section communicates with a channel 42 (see FIG. 4) formed by two elongated members 44 provided with a hooked tip 46 for gripping an electrical cord.

The bottom of the shaping device may be closed with a removable snap-on lid 48 if desired. For operation, the lid is removed and a standard "Dixie" cup pushed upwardly in the lower section so that it is supported by its rim on the inwardly spaced brackets 36. The unit is connected to a source of electricity. To shape crayons or other marker pens, it is only necessary to insert the tip of the crayon into the central opening 12 and cavity 22 of the heat-conductive member 20 to soften the tip and allow it to be shaped into a sharp point. Any excess melted wax drains through the drain 24 opening into the disposable cup 38.

The ceramic heater is designed to not overheat, yet provide sufficient heat for softening the tips of crayons. The unit is safe and easy for children to use.

We claim:

1. A device for shaping the end of a soft wax marker, comprising:

a vertically oriented housing having a lower section and a removable top section, the top section having a central opening therein and the lower section being sized to receive an upwardly opening disposable receptacle therewithin;

a heat-conductive member mounted in the top section, the heat-conductive member having a substantially vertically oriented, internal, conically shaped cavity tapered along its length, with the larger diameter of the cavity being toward the top of the top section and communicating with the opening in the top section;

a relatively small opening in the heat-conductive member located at the bottom of the conically shaped cavity for draining melted wax and sized to permit the free gravity flow of the melted wax therethrough for removal of the melted wax from the cavity;

an electric heater for heating the heatconductive member to a temperture sufficient to partially melt the wax marker for shaping the tip thereof; and means for positioning and removably holding the disposable receptacle within the lower section and beneath the heat-conductive member with the opening of the receptacle in registration with the opening located at the bottom of the conically shaped cavity for receiving melted wax dripping from the opening, the lower section having an open upper end for removal therethrough of the receptacle when the top section is removed from the lower section.

2. The device of claim 1 wherein the removable top section is conically shaped, and the heat-conductive member is supported by struts extending inwardly from the interior sidewalls of the top section, with the electric heater surrounding the heat-conductive member; and further including an electrical cord for connecting the electric heater to a source of electricity.

3. The device of claim 2 wherein the positioning means includes a supporting and guiding portion of the lower section adapted to support the top section and limit the lateral position of the top section relative to the lower section to keep the opening located at the bottom of the conically shaped cavity in registration with the opening of the receptacle, and wherein the lower section includes a base and sidewall, the lower section supporting and guiding portion including an upper end portion of the sidewall having an inner perimeter dimension adapted to closely receive a lower end portion of the conical top section therein, and further including circumferentially spaced brackets extending inwardly from the inner surface of the sidewall near the open upper end of the lower section, the brackets each having a first portion adapted to support the lower end portion of the top section and a second portion adapted to releasably support the rim of the disposable receptacle; and the device further including holding means extending down the length of the sidewall of the lower section communicating with an opening through the sidewall of the lower section near the bottom thereof for retaining the electrical cord connected to the electric heater.

4. A device for shaping the end of a soft wax marker, comprising:

a vertically oriented housing including a lower section having a base, sidewalls, an open top, and spaced, inwardly directed brackets around the inner periphery of the sidewall near the top;

a conically shaped, removable top section having a central opening therein, a heat-conductive member positioned below the central opening, struts extending from the sidewalls of the conical top portion for supporting the heat-conductive member, and heater means surrounding the heat-conductive member, the heat-conductive member having (1) a vertically oriented, conically shaped internal cavity, with the larger diameter of the cone facing upward and communicating with the central opening in the top section and (2) a relatively small opening in the bottom of the conically shaped cavity for draining melted wax;

a removable and disposable receptacle for melted wax supported in the lower section of the housing beneath the drain opening of the heat-conductive means by the inwardly directed brackets;

an electrical cord for connecting the heater means to a source of electricity; and means extending down the sidewall of the lower section including spaced-apart, inwardly directed gripping fingers for retaining the electric cord in place and directing it down the sidewall and out through an opening in the lower section of the sidewall.

5. The device of claim 3 wherein the second portion of brackets is at a height above the base of the lower section sufficient to suspend the receptacle, when having the size of a conventional disposable drinking cup, above the base.

6. The device of claim 1 wherein the positioning means includes a supporting and guiding member attached to the lower section, the supporting and guiding member supporting the top section generally above the lower section and limiting the lateral position of the top section relative to the lower section to keep the opening located at the bottom of the conically shaped cavity in registration with the opening of the receptacle, the supporting and guiding member supporting the disposable receptacle.

7. The device of claim 6 wherein the supporting and guiding member engages the rim of the disposable receptacle and is positioned to provide hanging support for the receptacle with the bottom of the receptacle being unsupported.

8. A device for shaping the end of a soft wax marker, comprising:

a vertically oriented housing having a lower section and a top section, the top section having a central opening therein and the lower section being sized to receive an upwardly opening disposable receptacle therewithin;

a heat-conductive member mounted in the top section, the heat-conductive member having a substantially vertically oriented, internal, conically shaped cavity tapered along its length, with the larger diameter of the cavity being toward the top of the top section and communicating with the opening in the top section;

a relatively small opening in the heat-conductive member located at the bottom of the conically shaped cavity for draining melted wax and sized to permit the free gravity flow of the melted wax therethrough for removal of the melted wax from the cavity;

an electric heater for heating the heat-conductive member to a temperature sufficient to partially melt the wax marker for shaping the tip thereof; and means for positioning and removably holding the disposable receptacle within the lower section and beneath the heat-conductive member with the opening of the receptacle in registration with the opening located at the bottom of the conically shaped cavity for receiving melted wax dripping from the opening, the lower section having an open end for removal therethrough of the receptacle.

* * * * *